US011210792B2

(12) United States Patent
Novikov et al.

(10) Patent No.: US 11,210,792 B2
(45) Date of Patent: Dec. 28, 2021

(54) AVOIDING CATASTROPHIC INTERFERENCE WHILE TRAINING AN ARTIFICIAL NEURAL NETWORK ON AN ADDITIONAL TASK

(71) Applicants:Agfa HealthCare NV, Mortsel (BE); VRVIS ZENTRUM FÜR VIRTUAL REALITY UND VISUALISIERUNG FORSCHUNGS-GMBH, Vienna (AT)

(72) Inventors: Alexey Novikov, Mortsel (BE); Katja Buehler, Mortsel (BE); David Major, Mortsel (BE); Maria Wimmer, Mortsel (BE)

(73) Assignees: Agfa HealthCare NV, Mortsel; VRVis Zentrum für Virtual Reality und Visualisierung Forschungs-GmbH, Vienna (AT)

( * ) Notice: Subject to any disclaimer, the term of this patent is extended or adjusted under 35 U.S.C. 154(b) by 0 days.

(21) Appl. No.: 16/757,438

(22) PCT Filed: Oct. 10, 2018

(86) PCT No.: PCT/EP2018/077589
§ 371 (c)(1),
(2) Date: Apr. 20, 2020

(87) PCT Pub. No.: WO2019/081208
PCT Pub. Date: May 2, 2019

(65) Prior Publication Data
US 2021/0073996 A1   Mar. 11, 2021

(30) Foreign Application Priority Data
Oct. 24, 2017  (EP) ................................ 17197899

(51) Int. Cl.
*G06T 7/10* (2017.01)
*G06T 7/00* (2017.01)

(52) U.S. Cl.
CPC .............. *G06T 7/10* (2017.01); *G06T 7/0012* (2013.01); *G06T 2207/20081* (2013.01); *G06T 2207/20084* (2013.01)

(58) Field of Classification Search
CPC ............. G06T 7/10; G06T 7/0012; G06T 2207/20081; G06T 2207/20084; G06N 3/08; G06N 3/0454; G06N 3/0481
See application file for complete search history.

(56) References Cited

U.S. PATENT DOCUMENTS

| 10,055,685 | B1* | 8/2018 | Arel ..................... G06N 20/00 |
| 2017/0169315 | A1 | 6/2017 | Vaca Castano et al. |
| 2017/0200067 | A1 | 7/2017 | Zhou et al. |
| 2018/0129912 | A1* | 5/2018 | Vernaza ............... G06K 9/6259 |
| 2018/0330238 | A1* | 11/2018 | Luciw ................. G06K 9/6222 |
| 2019/0034798 | A1* | 1/2019 | Yu .......................... G06N 3/063 |
| 2019/0065944 | A1* | 2/2019 | Hotson ................. G06N 3/084 |
| 2020/0285938 | A1* | 9/2020 | Kim ...................... G06N 3/088 |

FOREIGN PATENT DOCUMENTS

| CN | 107123123 A | 9/2017 |
| EP | 3 166 075 A1 | 5/2017 |
| EP | 3166075 A1 | 5/2017 |

OTHER PUBLICATIONS

Official Communication issued in International Patent Application No. PCT/EP2018/077589, dated Nov. 6, 2018.
Ratcliff, "Connectionist Models of Recognition Memory: Constraints Imposed by Learning and Forgetting Functions", Psychological Review, vol. 97, No. 2, 1990, pp. 285-308.
Jung et al., "Less-forgetting Learning in Deep Neural Networks", Journal of Latex Class Files, vol. XX, No. X, XXXX XXXX, Jul. 1, 2016, pp. 1-5.
Li et al., "Learning without Forgetting", IEEE, Feb. 14, 2017, pp. 1-13.
Kirkpatrick et al., "Overcoming catastrophic forgetting in neural networks", Jan. 25, 2017, pp. 1-13.
Isin et al., "Review of MRI-based brain tumor image segmentation using deep learning methods", ScienceDirect, Procedia Computer Science, vol. 102, Oct. 25, 2016, pp. 317-324.
Ronneberger et al., "U-Net: Convolutional Networks for Biomedical Image Segmentation", Network and Parallel Computing; Nov. 18, 2015, pp. 234-241.
International Search Report issued in International Patent Application No. PCT/EP2018/077589, 3 pp. (dated Nov. 6, 2018).
Işin et al., "Review of MRI-based brain tumor image segmentation using deep learning methods," Procedia Computer Science, 102: 317-324 (Oct. 25, 2016).
Jung et al., "Less-forgetting Learning in Deep Neural Networks," *J. of Latex Class Files*, vol. XX, No. X, XXXX XXXX, pp. 1-5 (Jul. 1, 2016) arXiv:1607.00122v1.
Kirkpatrick et al., "Overcoming catastrophic forgetting in neural networks," pp. 1-13 (Jan. 25, 2017) arXiv:1612.00796v2.
Li et al., "Learning without Forgetting," *IEEE*, pp. 1-13 (Feb. 14, 2017) arXiv:1606.09282v3.

(Continued)

*Primary Examiner* — Syed Haider
(74) *Attorney, Agent, or Firm* — Leydig, Voit & Mayer, Ltd.

(57) ABSTRACT

A method for training an artificial neural network on an additional untrained segmentation task prevents the loss of previously acquired segmentation skills on originally trained segmentation tasks.

7 Claims, No Drawings

(56) References Cited

OTHER PUBLICATIONS

McCloskey et al., "Catastrophic Interference in Connectionist Networks: The Sequential Learning Problem," *The Psychology of Learning and Motivation*, 24: 109-165 (1989).
Ratcliff, "Connectionist Models of Recognition Memory: Constraints Imposed by Learning and Forgetting Functions," *Psychological Review*, 97(2): 285-308 (1990).
Ronnenberger et al., "U-Net: Convolutional Networks for Biomedical Image Segmentation," Network and Parallel Computing, pp. 234-241 (Nov. 18, 2015).

* cited by examiner

AVOIDING CATASTROPHIC INTERFERENCE WHILE TRAINING AN ARTIFICIAL NEURAL NETWORK ON AN ADDITIONAL TASK

CROSS REFERENCE TO RELATED APPLICATIONS

This application is a 371 National Stage Application of PCT/EP2018/077589, filed Oct. 10, 2018. This application claims the benefit of European Application No. 17197899.2, filed Oct. 24, 2017, which is incorporated by reference herein in its entirety.

BACKGROUND OF THE INVENTION

1. Field of the Invention

The invention is situated in the field of artificial neural networks, which are computing systems inspired by the biological neural networks that constitute animal brains. More specifically, it is related to a method that prevents an artificial neural network that is trained to execute a segmentation task on medical images to forget its capability to accomplish an originally trained task when a new and different segmentation task is trained subsequently using the same network, but which targets the segmentation of a different object class or the same object class on a different modality or data with slightly different characteristics (e.g. data coming from a different hospital).

2. Description of the Related Art

Catastrophic interference (also known as catastrophic forgetting) is usually referred to as an inability of trained neural networks to remember previously learned information when training on a new task, following a previous task. This problem for connectionist networks was originally revealed in the works by Cohen et al. (M. McCloskey and N. J. Cohen, "Catastrophic interference in connectionist networks: The sequential learning problem," Psychology of learning and motivation, vol. 24, pp. 109-165, 1989.) and Ratcliff et al. (R. Ratcliff, "Connectionist models of recognition memory: Constraints imposed by learning and forgetting functions," Psychological review, vol. 97, no. 2, pp. 285-308, 1990.).

In the context of artificial neural networks, there have been a number of works dedicated to this problem in the recent years. Jung et al. (H. Jung, J. Ju, M. Jung, and J. Kim, "Less-forgetting learning in deep neural networks" arXiv preprint arXiv: 1607.00122, 2016.) and Li et al. (Z. Li and D. Hoiem, "Learning without forgetting," in European Conference on Computer Vision. Springer, 2016, pp. 614-629.) presented methods to alleviate the catastrophic interference problem when applied to a number of classification tasks. Kirkpatrick et al. (J. Kirkpatrick, R. Pascanu, N. Rabinowitz, J. Veness, G. Desjardins, A. A. Rusu, K. Milan, J. Quan, T. Ramalho, A. Grabska-Barwinska et al., "Overcoming catastrophic forgetting in neural networks," Proceedings of the National Academy of Sciences, p. 201611835, 2017.) trained an artificial neural network able to learn sequentially both classification tasks and playing Atari games. In medical imaging, field catastrophic interference can occur when parameters of existing neural networks are transfer learnt to a new task or datasets with images are acquired in a different hospital with other imaging devices or protocols.

In the development and research on classification networks, it is rather exceptional to train a neural network from scratch, it is more common to use a pre-trained network (for example, a pre-trained network that was trained on the ImageNet image database organized according to the WordNet hierarchy (http://www.image-net.org/)) to further apply feature extraction or to experiment with fine-tuning. In segmentation networks however, and more particularly in the medical imaging domain, it is not very common to use such pre-trained neural networks due to the unavailability of such vast freely available datasets. Segmentation is the process of identifying and outlining structures in a medical image. The result of a segmentation task for a particular object class (or anatomical structure) is a so-called ground truth mask, covering the positively identified surface in the image representing the sought anatomical structure. The resulting ground truth mask for a segmented object class of a particular medical image is represented as a binary image having pixel values of 0 or 1, the 1's representing the locations of the segmented structure in the image. The binary image thus serves as a mask that can be overlaid on the original image to identify the areas in the original image where the detected structure is present.

Another reason why pre-trained neural networks are not commonly used for segmentation purposes is that fully convolutional networks usually can be trained from scratch even without large sets of images. Therefore, joint-learning is a more common approach in segmentation networks, though fine-tuning and feature extraction can be used effectively too. This is true, provided that the new dataset is not completely different from the one on which the network was originally pre-trained.

In the case of fine-tuning of segmentation networks, the network parameters could change significantly during the process of additionally training a new object class, so that the old task could potentially be partially (or completely) forgotten even if the new images belong to the same modality (e.g. CXR images). Root causes for this "forgetting" can be two-fold: the new segmentation task could be very different in comparison with the initial segmentation task (e.g. lung and clavicle segmentation), and the intensity distributions between datasets can differ significantly due to a different source imaging modality or different acquisition protocol. Both issues can lead to catastrophic interference in segmentation.

Joint-training can be effectively used for segmentation in different datasets (e.g. coming from different data sources) on condition that the target objects for the joint-training are of the same type in all images of the dataset. However, this is not the case when different target objects of a very different nature are to be segmented on the same type of images and therefore the respective ground-truth masks for the target objects could cover very different areas in terms of type or size. E.g. consider the joint-segmentation of the clavicles and the lungs; the expected surface area of a ground-truth mask for the clavicles would be a lot smaller in comparison with the surface of the ground-truth of the lungs.

Moreover, problems could arise when some target objects would be present in ground-truth masks in a particular image for one class but absent for the other one(s). As an example, in CXR images it could happen that in one task it would be required to segment both lungs at the same time as one class but in the other task as two classes separately. Another example could be that in one task the segmentation of clavicles is pursued within the lungs fields only, while in another one the complete clavicles are to be segmented within a full image.

Another problem that can arise is that missing and overlapping target segmentation objects can make the building of the loss function that evaluates the quality of the segmentation a very challenging problem. In addition to the mentioned issues, training time increases when more images are added to the training set. In case of large 2D and 3D medical scans, and this time difference can be significant.

SUMMARY OF THE INVENTION

It is the objective of our invention to extend an existing image segmentation neural network, which already has been trained on an old task, with the capability of performing a new task, and this without forgetting the old task. This new task may comprise the capability of processing new image segmentation targets or processing new types of image datasets. This means that the newly trained neural network still is able to perform the old task next to the new task. Even when the target objects in the old and new tasks do not match or match only partially.

The advantage of the described method is that the method is much more resource efficient in comparison to the case where individual neural networks would have to be trained in parallel to perform the different tasks independently. This effect comes from the fact that when an image segmentation neural network is trained for an additional task a number of new parameters has to be added increasing the complexity of the network. However, this number of new parameters added for each new task to the neural network is significantly smaller than the total number of parameters in the network.

In machine learning and in the context of this invention, a convolutional neural network is a class of deep, feed-forward artificial neural networks that has successfully been applied to analysing visual imagery. Convolutional neural networks were inspired by biological processes in which the connectivity pattern between neurons is inspired by the organization of the animal visual cortex. Individual cortical neurons respond to stimuli only in a restricted region of the visual field known as the receptive field. The receptive fields of different neurons partially overlap such that they cover the entire visual field.

A neural network consists of a number of so-called layers (in our case convolutional layers) and weights (or parameters), of which most of the layers are "hidden" layers for which there is no direct contact with the input or output of the data. An image segmentation task is the objective to be achieved by an image segmentation neural network, and consists in the identification of the parts within a certain image to be part of (or represent) a so-called segmentation class. An image segmentation network thus tries to identify those parts of an image that represent the parts of a so-called segmentation class. An example of such a segmentation task in a medical imaging context may be for instance the identification of the lungs or the identification of the vertebrae of the spine.

Another type of neural networks are so-called classification networks, where it is the objective to identify parts of the image as a certain structure and as to positively identify or differentiate between multiple structures.

In the training phase of a classification neural network, the correct class for each record is known (this is termed supervised training), and the output nodes can therefore be assigned "correct" values—"1" for the node corresponding to the correct class, and "0" for the others. It is thus possible to compare the network's calculated values for the output nodes to these "correct" values, and calculate an error term for each node. These error terms are then used to adjust the weights in the hidden layers so that, hopefully, the next time around the output values will be closer to the "correct" values. The adjustment of these weights comes down to minimizing a so-called loss function.

A similar approach is chosen for the training of segmentation networks; the desired or reference outcome for the segmentation task is an annotated image marking the areas with the desired detectable segmentation classes. Such a result image is then represented as a so-called ground-truth mask.

DETAILED DESCRIPTION OF THE PREFERRED EMBODIMENTS

Further advantages and embodiments of the present invention will become apparent from the following description. The present invention can be implemented as a computer program product adapted to carry out the steps as set out in the description.

In order to describe the invention, the multi-class segmentation approach is described mathematically as follows.

For a given integer number k and segmentation task $T^k$, let $S^k$ be a set of n images $\{1_1^k, \ldots 1_n^k\}$ with pixels $x=(x_1, x_2)$ on a discrete grid $m_1 \times m_2$ and intensities $1_i^k(x) \in J \subset \mathcal{R}$. Additionally, for each image $I_i^k \in S^k$, a sequence $M_i^k := (M_{i,l}^k)_{l=1}^{n^k}$ of binary non-overlapping ground-truth masks $M_{i,l}^k \in \mathcal{M} := M^{m_1 \times m_2}(\{0,1\})$ is available, where $n^k$ is cardinality of the ordered set of semantic class labels $\mathcal{L}^k = \{1_1^k, \ldots, 1_n k^k\}$ related to task $T^k$.

Let $\mathcal{M}' := M^{m_1 \times m_2}(\{0, \ldots, n^k\})$ denote the space of matrices $m_1 \times m_2$ with values $\{0, \ldots, n^k\}$ that correspond to the semantic labels of $\mathcal{L}^k$.

Let g be a mapping of a ground truth sequence $M_i^k$ into $\mathcal{M}'$, $g: \mathcal{M}^{n^k} \to \mathcal{M}'$, $G_i^k := g(M_i^k) = \sum_{l=1}^{n^k} 1 \, M_{i,l}^k$.

For a given image $I_i^k \in S^k$, let $G_i^k \in \mathcal{M}'$ be its ground truth matrix, derived as described above, and $\pi_l: \mathcal{M}' \to \mathcal{M}$, $\pi_l(G_i^k) = M_{i,l}^k$ At the projection of $G_i^k$ onto $\mathcal{M}$ for the semantic class $l \in \mathcal{L}^k$, i.e., the well-defined inverse mapping for the above operation g.

For training and evaluation purposes, the dataset $S^k$ is split into three non-overlapping sets, namely $S_{TRAIN}^k$, $I_{VALID}^k$ and $I_{TEST}^k$. During training, small batches of images $B^k \in Par^k$ are passed consecutively onto the neural network, where $Par^k$ is a complete partition of the set $I_{TRAIN}^k$. For later reference, let $c_B^k$ be the total pixel count over all images $1_i^k \in B^k$. For each image $1_i^k$, the multiclass output of the neural network is calculated. The neural network can in other words be represented as a function:

$$N^k: S^k \to \mathcal{M}'$$

$N^k(I_i^k)$ n derives for each pixel x of $I_i^k$ its semantic class l in a single step as a probability. In order to estimate and maximize this probability, we define a loss function:

$$A: S^k \times \mathcal{M}' \to \mathcal{R}$$

that estimates the deviation between the result generated by the neural network and the ground truth (or desired outcome).

Given a neural network $N^j$ with weight parameters $W^j$, the calculated deviation A is subsequently used to update and optimize the neural network parameters $w^j$ in order to improve the performance of the network. This procedure is repeated until a defined set of stopping criteria are fulfilled, and is called the training of the neural network. The solving of the task Ti is in other words the process of iteratively calculating the optimal parameters $w^j$ of the network $N^j$.

Since in multi-class segmentation, the sizes of the targeted object classes may be very different, a higher contribution to the loss function may be expected by the object classes with larger expected sizes. This effect is not desirable as it can suppress the improvements to the neural network parameters during training on its performance for the smaller sized object classes. In order to compensate for this, weighting coefficients $r_{B,l}^k$ are implemented for each semantic class l in the ratio:

$$r_{B,1}^k := \frac{c_{B,1}^k}{c_B^k},$$

where $c_{B,l}^k$ is the number of pixels belonging to class l in the training batch $B^k$.

For a distance function $d: S^k \times \mathcal{M}' \to \mathcal{R}$ and an image $I_i^k \in B^k$ we define and minimize our loss function as follows:

$$\Lambda(I_i^k, G_i^k) := -\left(\sum_{l=1}^{r^k} r_{B,1}^k\right)^{-1} \sum_{l=1}^{r^k} \frac{d_l(I_i^k, G_i^k)}{G_i^k}$$

The distance function d for the Dice coefficient for a training image $I_i^k$, the l-th feature channel corresponding to the semantic class l and ground truth mask $G_i^k$, can be defined as:

$$d_l^{dice}(I_i^k, G_i^k) := 2\frac{|P_l(I_i^k) \cap \pi_l(G_i^k)|}{|P_l(I_i^k)| + |\pi_l(G_i^k)|}$$

Where $P_l(I_i^k)$ in is the set of pixels at the l-th feature channel where the model is certain that they don't belong to the background, i.e., $$P_l(I_i^k) := \{x : x \in I_i^k \land |p_l(x) - 1| < \epsilon\}$$

where 531 is a chosen tolerance value, $p_l(x)$ is the sigmoid activation function $$p_l(x) := \frac{1}{1 + e^{-a_l(x)}}$$

and $a_l(x)$ indicates activation at the l-th feature channel and pixel $x \in I_i^k$.

In the context of this invention, a multi-class segmentation task has to be understood as a segmentation task that deals consecutively with the segmentation of different classes of segmentation targets. A simple image segmentation task is an image processing method that attempts to accurately determine the area in a digital image that comprises pixels that represent a particular "class". The so-called "class" refers to a structure, organ or feature that is the target of the segmentation algorithm.

A multi-class segmentation task has thus to be understood as a series of sequentially executed segmentation tasks targeted to different classes.

A Neural Network

Further to the methods disclosed in the art, our method intends to further alleviate the problems of catastrophic interference by means of applying a sequence of multiclass segmentation tasks according to the following method steps:—applying the previously trained neural network $N^{k-1}$ to said set of input images $S^k$ to calculate the result masks $G_i^k(T^j)$, j=1, . . . , k-1 for all previously trained tasks $T^1, \ldots, T^{k-1}$, —defining a new neural network $N^k$ by adding a new (1,1) convolutional layer in parallel to the existing output layers of the already trained neural network $N^{k-1}$, —initialize randomly the newly added parameters $\tilde{w}^k$ corresponding to said new (1,1) convolutional layer and subsequently train the new neural network $N^k$ on said additional segmentation task $T^k$ using the set of input images $S^k$ and said previously calculated result masks $G_i^k(T^j)$, j=1, . . . , k-1 and the set of ground-truth segmentation masks $G_i^k(T^k)$, wherein the loss function of the training process is defined as the general loss function:

$$D^{combined} = \sum_{j=1}^{k} \lambda_i D(T^j)$$

wherein $\lambda_i$, i=1, . . . , k represent the relative weights of the tasks in the total loss function, so that $\Sigma_i \lambda_i = 1$, and wherein:

$$D(T^j) = (|S^k|)^{-1} \sum_{i=1}^{|S^k|} \Lambda(I_i^k, G_i^k(T^j)), j = 1, \ldots, k$$

and where $$\Lambda(I_i^k, G_i^k) := -\left(\sum_{l=1}^{r^k} r_{B,1}^k\right)^{-1} \sum_{l=1}^{r^k} \frac{d_l(I_i^k, G_i^k)}{G_i^k}$$

One of the aspects of the solution proposed in our method is that the calculated result masks for tasks $T^1, \ldots, T^k$ are temporarily stored (in case of a computer implementation) as ground-truth segmentation masks $G_j$k for the previously trained segmentation tasks $T^1, \ldots T^k$. This aspect is a solution to the missing data of the result masks for the new set of images on which the new task is (manually) defined. The result masks for the previously trained tasks cannot be assumed to be calculated on the new image set, and therefore a calculation of all (previously trained) tasks on the new data set is assumed to render the best results to complete the entire data set with results for all known tasks.

The above inventive method is preferably carried out by a computer program running on means which provide generic data processing functions. Such means can, for example, be embedded in a personal computer, smartphone, mainframe, etc. . . . .

The trained convolutional neural network which is the result of the method explained above, can be captured and stored in a memory as a collection of data comprising the structure of the neural network and the parameters that have been calculated during the training step of said neural network. It can thus be envisaged that the resulting trained neural network model and data comprise the functional definition of the neural network which is capable of performing said classification tasks. This functional definition (which is in essence a set of weights and connections) may be copied and duplicated or propagated onto other computing means. It is also this functional definition that we seek to protect under this patent. Said neural network data may thus be transferable under the form of a collection of weights and connections.

The above described method will provide an improved performance of the untreated neural network, but the trained neural network itself may be used to carry out tasks in an improved way in comparison with the untreated network. Therefore, the neural network trained using the newly disclosed method in this application may be used to perform segmentation tasks in an improved way.

The invention claimed is:

1. A method for training a previously trained neural network $N^{k-1}$, where N is a neural network, to perform an additional segmentation task $T^k$, where T is a segmentation task, in addition to i previously trained segmentation tasks $T^i$ on the previously trained neural network $N^{k-1}$ in which i =1, . . . , k-1, and k>2, the additional segmentation task $T^k$ is defined by a set of input images $S^k$, where S is an input image, and a corresponding set of ground-truth segmentation masks $G_i^k(T^k)$, where G is a ground-truth mask, in terms of a desired result, and the previously trained neural network $N^{k-1}$ is defined by a set of parameters $\tilde{w}^{k-1}$ where $\tilde{w}$ is a parameter, a discrete number of convolution layers y, and a defined number of output layers z, the method comprising:

applying the previously trained neural network $N^{k-1}$ to the set of input images $S^k$ to calculate result masks $G_i^k(T^j)$, j=1, . . . , k-1 for all of the previously trained segmentation tasks $T^1$, . . . , $T^{k-1}$, defining a new neural network $N^k$ by adding a new (1,1) convolutional layer in parallel to existing output layers of the previously trained neural network $N^{k-1}$;

initializing randomly newly added parameters $\tilde{w}^k$ corresponding to the new (1,1) convolutional layer and subsequently training the new neural network $N^k$ on the additional segmentation task $T^k$ using the set of input images $S^k$ and the calculated result masks $G_i^k(T^j)$, j=1, . . . , k-1 and the set of ground-truth segmentation masks $G_i^k(T^k)$; wherein a loss function, where D is a loss, of the training is defined as a general loss function:

$$D^{combined} = \Sigma_{j=1}^k \lambda_i D(T^j) ;$$

wherein $\lambda_i$, i=1, . . . , k represent relative weights of the tasks in a total loss function such that $\Sigma_i \lambda_i = 1$;

$$D(T^j) = (|S^k|)^{-1} \sum_{i=1}^{|S^k|} \Lambda(I_i^k, G_i^k(T^j)), j = 1, \ldots, k; \text{ and}$$

$$\Lambda(I_i^k, G_i^k) := -\left(\Sigma_{l=1}^{n^k} r_{B,l}^k\right)^{-1} \Sigma_{l=1}^{n^k} \frac{d_l(I_i^k, G_i^k)}{G_i^k}.$$

where $r_{B,l}^k$ is a weight coefficient and $d_l$ is a distance function, where d is a distance, for a Dice coefficient for a training image $I_i^k$, where l is a feature map.

2. A method for training a neural network on a set of multi-class medical image segmentation tasks according to the method of claim 1.

3. The method according to claim 1, wherein a number of feature maps l corresponds to a number of target segmentation objects in the additional segmentation task $T^k$.

4. A data processing apparatus comprising: means for performing the method according to claim 1.

5. A trained neural network obtained by performing the method according to claim 1.

6. A method for executing segmentation tasks $T^i$ using the trained neural network $N^k$ obtained by performing the method of claim 1, wherein i=1, . . . , k.

7. A non-transitory computer readable medium including a computer program comprising instructions which, when the computer program is executed by a computer, cause the computer to carry out the method according to claim 1.

* * * * *